INVENTOR.
Allen E. Smoll

Dec. 27, 1960 A. E. SMOLL 2,966,675
RADAR BEACON SYSTEM WITH SIDE LOBE SUPPRESSION
Filed Oct. 23, 1957 4 Sheets-Sheet 2
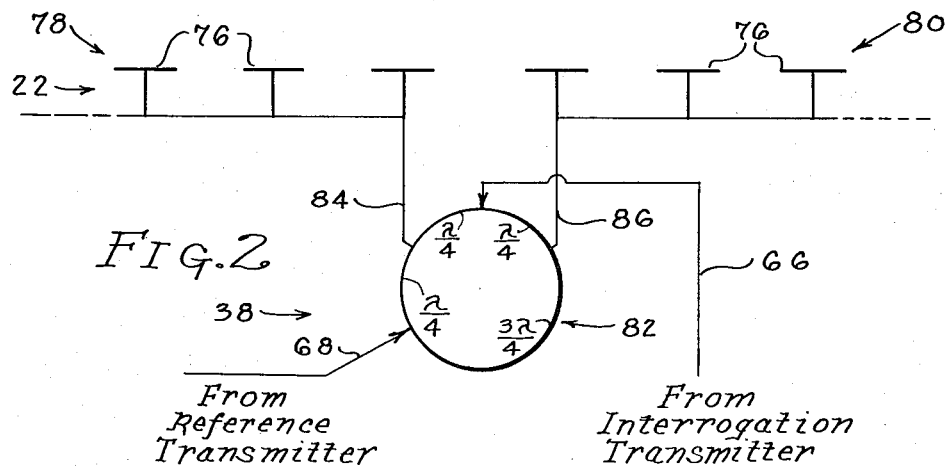
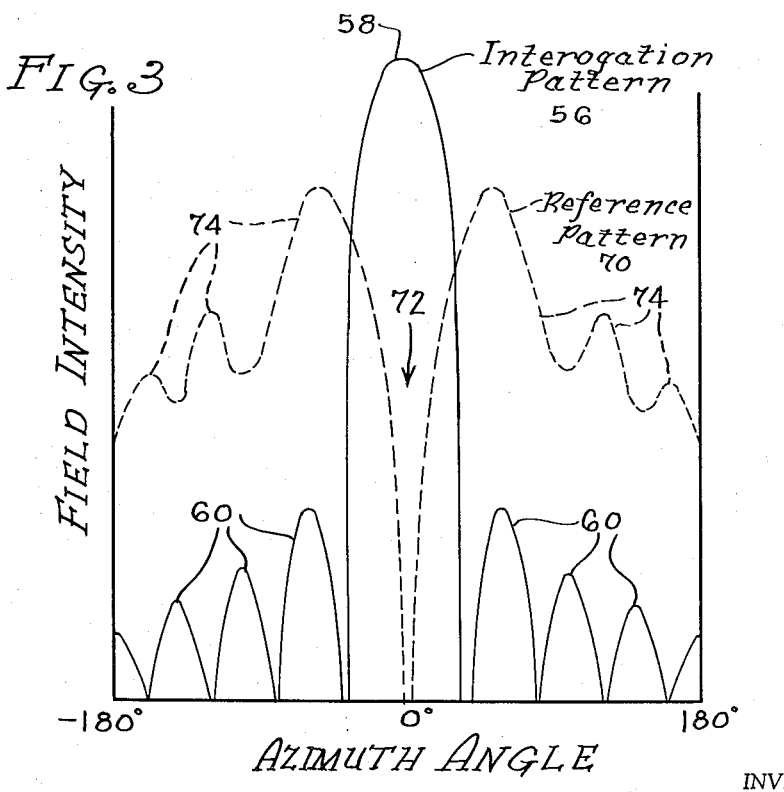
INVENTOR.
Allen E. Smoll
BY
Ooms, McDougall, Williams & Hersh
Attorneys Dec. 27, 1960     A. E. SMOLL     2,966,675
RADAR BEACON SYSTEM WITH SIDE LOBE SUPPRESSION
Filed Oct. 23, 1957     4 Sheets-Sheet 3
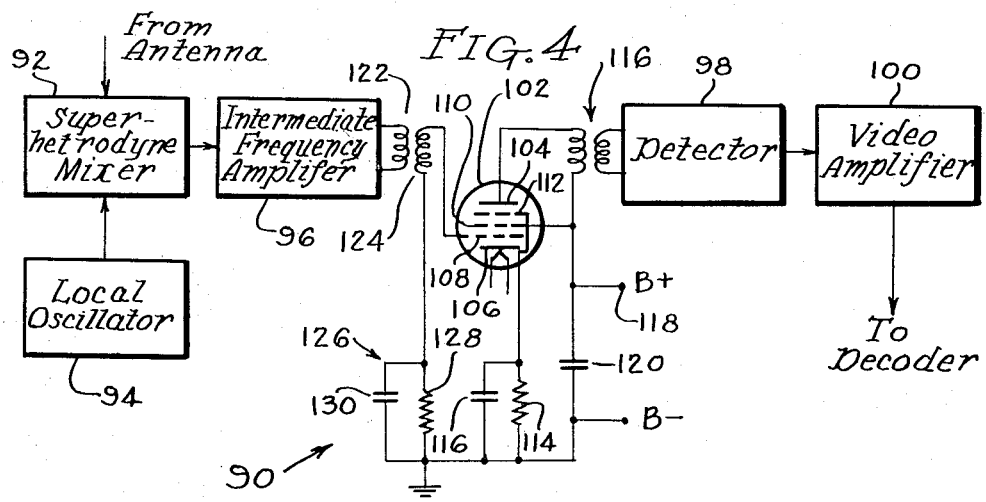
INVENTOR.
Allen E. Smoll
BY
Dorris, McDougall, Williams & Hersh
Attorneys United States Patent Office 2,966,675
Patented Dec. 27, 1960

2,966,675

RADAR BEACON SYSTEM WITH SIDE LOBE SUPPRESSION

Allen E. Smoll, Arlington, Mass., assignor to Stewart-Warner Corporation, Chicago, Ill., a corporation of Virginia Filed Oct. 23, 1957, Ser. No. 691,994

1 Claim. (Cl. 343—6.5)

This invention relates to radar systems, particularly radar beacon systems of the type in which a ground radar set sends out interrogation pulses which are received by transponders on aircraft, and which cause the transponders to send back reply pulses.

Another object of the present invention is to provide a new and improved radar beacon system which is arranged to prevent the transponders from responding to interrogation pulses in the side lobe regions of the directional antenna employed on the radar set, while creating no impediment to responses to interrogation pulses in the major lobe of the directional antenna. A further object is to provide a new and improved radar beacon system having a radar set which achieves suppression of side lobe responses, while being fully compatible with transponders designed for use with prior systems not having such side lobe suppression.

Another object is to provide a new and improved radar beacon system in which responses are positively suppressed throughout the side lobe region, for all vertical angles of radiation.

Still another object is to provide a new and improved radar beacon system in which the suppression of side lobe responses is achieved with a minimum of additional equipment, and at a minimum cost, both as to initial investment and as to operating power requirements.

Further objects and advantages of the present invention will appear from the following description, taken with the accompanying drawings, in which:

Fig. 2 is a schematic diagram of a hybridizer or hybrid junction whereby interrogation and reference pulses are fed to a single radar antenna in the radar beacon system of Fig. 1.

Fig. 3 is a curve or graph showing typical directional patterns, produced by the antenna arrangement of Fig. 2, for radiation of the interrogation and reference pulses.

Fig. 4 is a schematic diagram showing a suppression circuit embodied in the transponder of the radar beacon system shown in Fig. 1.

Fig. 5 is a waveform diagram representing one arrangement of the transmitted reference and interrogation pulses.

Fig. 6 is a waveform diagram showing the relation of the received reference and interrogation pulses in the major interrogation lobe of the directional antenna.

Fig. 7 is a waveform diagram showing the relation of the reference and interrogation pulses in the side lobe region of the directional antenna.

Figs. 8 and 9 are waveform diagrams showing modified arrangements of the transmitted reference and interrogation pulses.

Figure 1:
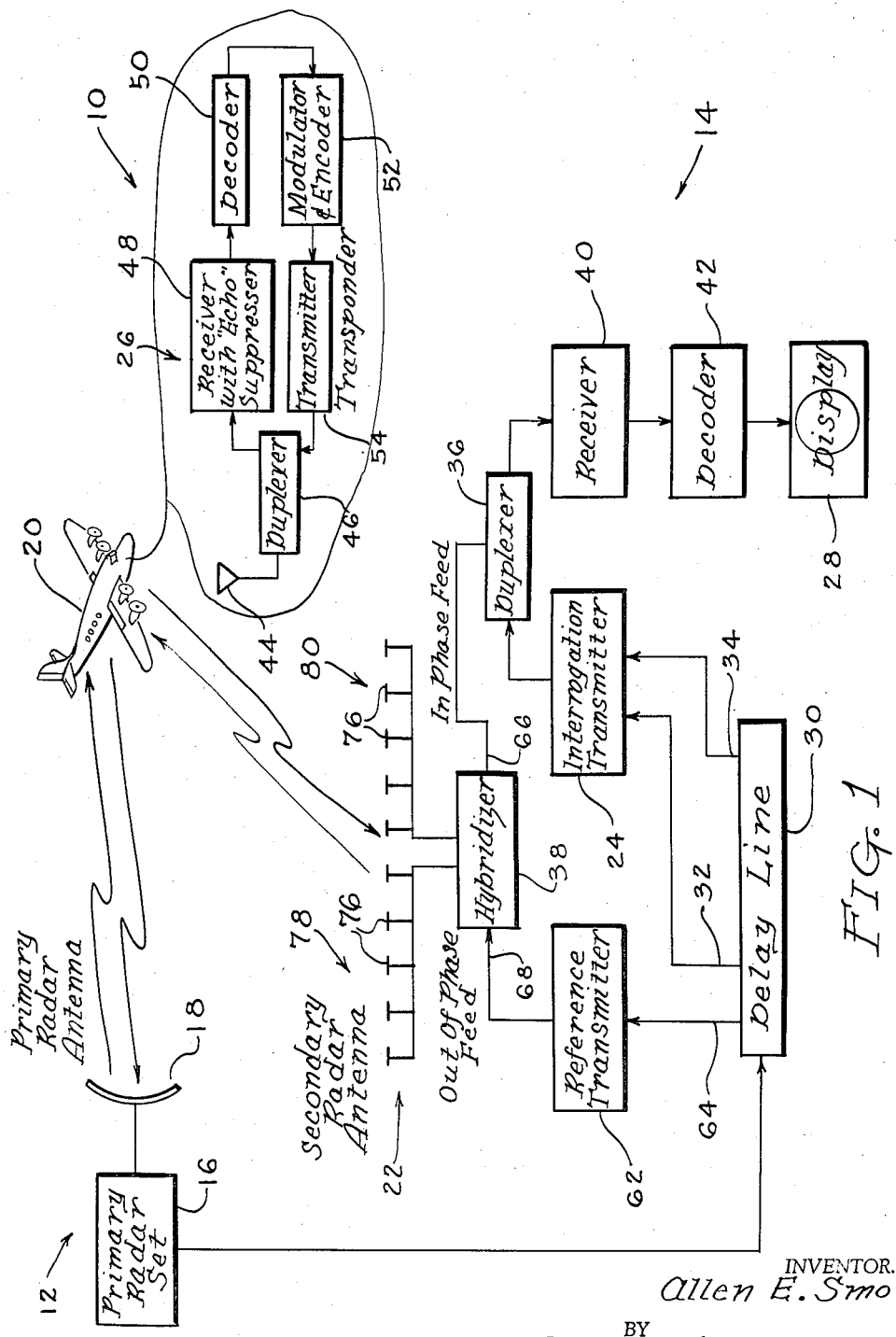
Fig. 1 is a block diagram of a radar beacon system which will be described as an illustrative embodiment of the present invention.

As already indicated, Fig. 1 illustrates a radar system 10 which actually comprises a combination of a primary radar system 12 and a secondary or beacon radar system 14. The primary radar system 12 comprises a radar set 16 adapted to generate pulses of microwave radio energy. The pulses are fed to a primary radar antenna 18 which radiates them along a narrow beam. Any aircraft or other object in the path of the beam will deflect the pulses back to the antenna 18. Such an aircraft is shown at 20. The returned pulses are displayed on the radar set 16, generally in such a manner as to indicate the direction and distance of the aircraft from the primary radar set.

The secondary or beacon radar 14 is employed to provide stronger return signals from aircraft equipped with beacon equipment. Thus, the secondary radar 14 comprises a directional antenna 22 adapted to radiate pulses of microwave energy generated by an interrogation transmitter 24. The pulses travel to the aircraft 20, which is assumed to be within range of the secondary radar 14. The aircraft 20 is equipped with a transponder 26 adapted to receive the secondary radar pulses and to send back reply pulses. The reply pulses are received by the secondary radar antenna 22 and are registered on a display or indicator 28, generally in such a manner as to indicate the position and distance of the aircraft.

In the known manner, the interrogation pulses from the secondary radar 22 may be coded, and the transponder 26 may be arranged to respond to coded pulses only. Thus, the interrogation pulses may be arranged in pairs, with coded spacing therebetween, as shown in Fig. 5. In other words, each train or cycle of interrogation pulses may comprise first and second pulses $I_1$ and $I_2$, with suitable spacing therebetween. While various spacings may be employed, a spacing of eight microsecond has been commonly employed and may be utilized in the present embodiment.

The pairs of interrogation pulses may conveniently be derived from the primary radar set 16 by routing a triggering pulse therefrom along a delay line 30. Triggering pulses corresponding to the interrogation pulses $I_1$ and $I_2$ may be picked off the line 30 at spaced points 32 and 34 therealong, and may be utilized to trigger the interrogation transmitter 24. The interrogation pulses from the transmitter 24 may be routed to the antenna 22 by way of a transmit-receive duplexer 36 and a hybridizer or hybrid junction 38, to be described in greater detail shortly. The received return pulses from the transponder are routed through the hybridizer 38 and the duplexer 36 to a receiver 40, which demodulates the pulses. From the receiver 40 the pulses are fed to a decoder 42, which passes properly coded pulses only, and sends them on to the display 28.

The transponder 26 may comprise an omnidirectional antenna 44, adapted to receive secondary radar pulses from all directions, and send out reply pulses in all directions. The received pulses are routed through a transmit-receive duplexer 46 to a receiver 48, which demodulates the pulses and feeds them to a decoder 50. Properly coded pulses pass through the decoder 50 and actuate a modulator and encoder 52, which triggers a transmitter 54 so as to generate reply pulses. The reply pulses are routed through the duplexer 46 to the antenna 44.

The secondary radar antenna 22 is made highly directional so as to concentrate the energy radiated therefrom within a narrow angle or beam. Likewise, the antenna 22 receives energy with the greatest efficiency only within the narrow angle. A directional pattern typical of the available highly directional antennas is shown in solid lines in Fig. 3 and is indicated as 56. It will be seen that the directional pattern 56 has a major lobe 58 which is confined to a narrow angle, and which represents most of the energy radiated by the antenna 22. However, the directional pattern 56 has a number of smaller side lobes 60 on either side of the major lobe 58. The field intensity in the side lobes is much lower than in the major lobe 58, but the side lobes represent a significant amount of radiated energy, which has often been found to be sufficient to trigger transponders on aircraft. Transponder replies caused by radiation of interrogation pulses in the side lobe regions are false or spurious, because they come from a direction other than the direction of the secondary radar beam. Such spurious replies tend to cause confusion by cluttering up the display on the secondary radar.

The suppression of the side lobe interrogations is thus a desirable objective, which, however, has proved to be difficult to attain. In order to reliably detect aircraft the beacon system must be overdesigned. Variations in the interrogation path occur because of the non-isotropic characteristics of the airborne antenna, atmospheric attenuation, non-uniform vertical coverage from the secondary radar antenna, and equipment degradation. All together these effects may degrade the interrogation path by as much as 40 db. Hence, if at some range a beacon-equipped aircraft can be reliably detected under the poorest combination of factors, it is also likely to be interrogated on the secondary radar antenna sidelobes when the most favorable conditions exist, unless the sidelobes are at least 40 db below the peak of the major lobe—a requirement that is difficult to meet. It is desired to track reliably aircraft at ranges of up to 200 nautical miles and to within 1 mile of the radar site. This variation in range alone will cause a 46 db change in power received by the transponder, thus making it further impossible to choose system parameters to prevent sidelobe interrogation.

With equipments now employed, interrogation can occur over practically the whole azimuth scan of the secondary radar antenna for ranges less than 15 to 30 miles depending on the type of secondary radar.

Sidelobe interrogation has several detrimental effects. It can cause overloading of the transponder which in turn, due to automatic overload circuits, causes failure to reply to the more distant interrogators. This effect is called pseudo capture. After a reply, the typical transponder is rendered inactive for a certain period, roughly 100 microseconds. Interrogations falling within this dead time will not be replied to. Sidelobe interrogation will thus cause missed replies. Another problem arises from the fact that the transponder replies are broadcast to and displayed by all secondary radars within range of the transponder. These unsynchronized replies, also called clutter and fruit, tend to obscure synchronized replies, particularly under conditions of high radar density and high air traffic density.

In the illustrated embodiment of the present invention, reference pulses are transmitted by the secondary radar 14 so that the transponder 26 will have a basis for determining whether the received interrogation pulses are in the major interrogation lobe 58 or the interrogation side lobes 60. The reference pulses are radiated with a different directional pattern than the interrogation pulses, so that the received interrogation pulses will be substantially greater than the reference pulses when the interrogation pulses are received in the major lobe, but will be substantially less than the reference pulses when received in the side lobes. For side lobe reception, the larger reference pulse is employed to suppress at least one of the interrogation pulses, so as to spoil the coding of the received pulses and thereby prevent the transponder from responding.

Thus, the secondary or beacon radar 14 is equipped with a reference pulse transmitter 62 which generates reference pulses and transmits them to the antenna 22 through the hybridizer 38. A trigger pulse for the reference transmitter may conveniently be picked off the delay line 30 at a point 64 therealong. As illustrated in Figs. 5-9, it is preferred to provide one reference pulse R for each pair of interrogation pulses $I_1$ and $I_2$. The reference pulse R may be related in various ways to the interrogation pulses $I_1$ and $I_2$. But it is preferred to employ an arrangement, such as the one shown in Fig. 5, in which the reference pulse closely precedes one of the interrogation pulses, in this case, the first interrogation pulse $I_1$. The reference pulse R may also be timed to closely precede the second interrogation pulse $I_2$, as shown in Fig. 8. The magnitude and duration of the reference pulses may be suitably varied. Typically, the reference pulse R is somewhat greater in magnitude than the interrogation pulses $I_1$ and $I_2$ as indicated in Fig. 5, but the reference pulse may be equal in magnitude to the interrogation pulses, as shown in Fig. 9, or even smaller in magnitude than the interrogation pulses, as shown in Fig. 8. The duration of the reference pulse R may conveniently be the same as that of the interrogation pulses, but may be greater, as shown in Fig. 8, or less, as shown in Fig. 9. The spacing between the reference pulse R and the adjacent interrogation pulse may be varied, but preferably is made quite small. It is desirable to avoid timing the reference pulse so that it will be separated from either of the interrogation pulses by an interval corresponding to the interval between the interrogation pulses, or any other interval commonly used as a code interval between interrogation pulses of radar systems.

As already indicated, the reference pulses R are radiated with a different directional pattern than the interrogation pulses. The directional pattern for the reference pulses is preferably such that the reference pulses are radiated with greater intensity in the interrogation side lobe region than in the major interrogation lobe. This might be achieved after a fashion by providing a separate antenna system for the reference pulses, but this would have the disadvantage that the interrogation and reference antennas would have different vertical radiation patterns, with the result that the desired relation between the reference and interrogation pulses might not be maintained at all vertical angles. Thus, in the arrangement of the illustrative embodiment, the same directional antenna 22 is made to serve for both the interrogation and reference pulses. The antenna 22 is provided with first and second input connections 66 and 68, adapted to receive the interrogation and reference pulses, respectively. Pulses fed to the antenna by way of the input connection 66 will be radiated with a directional pattern, such as the directional pattern 58, suitable for interrogation. Pulses fed to the antenna 22 by way of the second input connection 68 will be radiated with a different directional pattern 70, shown in broken lines in Fig. 3, and designated the reference pattern. This pattern 70 has a null or minimum point 72 coinciding with the major interrogation lobe 58. Relatively high side lobes 74 are formed on either side of the null 72. The reference side lobes 74 are substantially higher than the interrogation side lobes 60. Thus, the reference pulses are radiated with greater intensity than the interrogation pulses throughout the side lobe region. Only in the central portion of the major interrogation lobe do the interrogation pulses exceed the reference pulses in intensity. Because of the null 72, the interrogation pulses are much stronger than the reference pulses in the central portion of the major interrogation lobe 58.

While various dual pattern antenna arrangements may be employed, the illustrated antenna 22 is shown as comprising a plurality of colinear radiating elements 76, divided into left and right hand groups 78 and 80. The first and second input connections 66 and 68 lead to the hybridizer 38, which is adapted to feed the antenna groups 78 and 80 in phase from the first connection 66, but out of phase from the second connection 68.

This may be achieved in various ways, but, in the specific arrangement illustrated in Fig. 2, the hybrid junction 38 comprises a closed or annular transmission line 82 which is three half-wavelengths in length. The antenna groups 78 and 80 are fed by transmission lines 84 and 86 connected to the closed line 82 at points spaced one half-wavelength apart. The first input connection or line 66 is connected to the closed transmission line 82 at a point which is symmetrical with respect to the antenna feeder lines 84 and 86. Thus, the illustrated input line 66 is connected to the closed line 82 at a point spaced one quarter-wavelength from each of the antenna feeder lines 84 and 86, so as to feed the lines 84 and 86 in phase. The second input line 68 is connected to the closed line 82 at a point which is asymmetrical with respect to the feeder lines 84 and 86. More specifically, the illustrated input line 68 is connected to the closed line 82 at a point which is spaced one quarter-wavelength from the line 84, and three quarter-wavelengths from the line 86. Thus, the input line 68 feeds the antenna groups 78 and 80 in diametrical opposite phases. This feeding arrangement produces the null 72 and the high side lobes 74 of the reference pattern.

Fig. 6 illustrates the received reference and interrogation pulses at a point within the major interrogation lobe. It will be seen that the reference pulse R is substantially smaller than the interrogation pulses $I_1$ and $I_2$.

When the point of reception is in the side lobe region, the relationship of the reference and interrogation pulses is as shown in Fig. 7. The reference pulse R is substantially greater than the interrogation pulses $I_1$ and $I_2$. This difference enables the transponder to distinguish between the major interrogation lobe and the side lobe region.

The transponder 26 may be equipped with a suppression circuit, embodied in the receiver 48, to suppress at least one of the interrogation pulses when the interrogation and reference pulses are being received in the interrogation side lobe region. The suppression circuit may be arranged, for example, in the manner of echo suppression circuits, already known. Such circuits suppress any pulse which is closely preceded by a larger pulse. This is the relation between the interrogation pulse $I_1$, and the reference pulse R when the pulses are received in the interrogation side lobe region, as illustrated in Fig. 7. The reference pulse R closely precedes and is substantially greater than the interrogation pulse. The interrogation pulse thus is related to the reference pulse in the manner of an echo.

A suitable suppression circuit 90 is shown in Fig. 4. As already indicated, the suppression circuit 90 may be embodied in the receiver 48 of the transponder. Thus, the receiver comprises the usual super-heterodyne mixer 92, which receives the reference and interrogation pulses from the antenna 44 by way of the duplexer 46. A local superheterodyne oscillator 94 feeds its output to the mixer 92, so that the pulses are converted to an intermediate frequency. The pulses are then passed through an intermediate frequency amplifier 96 to the suppression circuit 90, which may take the form of the last stage in the intermediate frequency amplifier. The output of the suppression circuit 90 goes to a detector 98, which feeds a video amplifier 100. The input of the decoder 50 receives the pulses from the video amplifier 100.

The illustrated suppression circuit 90 utilizes an amplifying tube or other element 102. As illustrated, the tube 102 takes the form of a pentode having an anode 104, an indirectly heated cathode 106, a control grid 108, a screen grid 110, and a suppressor grid 112, the latter being connected directly to the cathode 106. The cathode 106 is connected to ground through a cathode-biasing resistor 114, bypassed by a capacitor 116. The anode 104 is connected to an output transformer 116 and thence to a positive anode supply terminal 118, which is bypassed to ground by a capacitor 120, the negative supply terminal being grounded, as shown.

An input transformer 122 is connected between the intermediate frequency amplifier 96 and the tube 102. Thus, the transformer 122 has a secondary winding 124 with one side thereof connected to the grid 108, and the other side connected to ground through a low time constant biasing or integrating circuit 126. As shown, the grid-biasing circuit 126 comprises a resistor 128 in parallel with a capacitor 130. The time constant of the circuit 126 may be a few microseconds. For example, the resistor 128 may have a value of 10,000 ohms, while the capacitor 130 may have a value of 470 micro-microfarads, giving a time constant of 4.7 microseconds. Any strong pulse received by the suppression circuit 90 will develop a negative voltage across the resistor 128. This voltage will charge the capacitor 130, so that the sensitivity of the tube 102 will be reduced. This reduction in sensitivity will persist until the capacitor 130 is discharged through the resistor 128, with the result that any smaller pulse closely following the large pulse will be suppressed, either completely or at least partially. The suppression will be substantially complete if the following pulse is substantially smaller than the initial pulse, and if the spacing between the pulses is substantially less than the time constant of the circuit 126.

When either of the interrogation pulses is suppressed, the code of the interrogation pulses is spoiled, with the result that the decoder 50 will not pass an actuating signal to the modulator and encoder 52. Accordingly, the transponder 26 will not send out a reply. Thus, the transponder does not reply to interrogation pulses in the interrogation side lobe region.

When the reference pulse R is transmitted in closely preceding relation to the first interrogation pulse $I_1$, as shown in Figs. 5 and 9, the first pulse is suppressed by the transponder in the side lobe region. On the other hand, the second interrogation pulse $I_2$ is suppressed by the transponder in the side lobe region when the reference pulse R is transmitted shortly before the second interrogation pulse $I_2$, but after the first interrogation pulse $I_1$, as shown in Fig. 8. In either case, the coding of the interrogation pulses is spoiled in the side lobe region, so that the transponder will not send out a reply.

It may be helpful to summarize the operation of the radar system 10. The primary radar 12 functions in the conventional manner, sending out pulses and receiving and displaying echoes or reflected pulses. The primary radar also sends triggering pulses along the delay line 30 to operate the secondary or beacon radar 14. In this summary, it will be assumed that the secondary radar 14 transmits pulses arranged as shown in Fig. 5, with the reference pulse R closely preceding the first interrogation pulse $I_1$, and with the second interrogation pulse $I_2$ spaced from the first pulse by a coded interval. Thus, a trigger pulse is picked off the delay line 30 at the point 64 and is routed to the reference transmitter 62, which generates the reference pulse. By virtue of the hybridizer 38, the reference pulse is fed to the left and right hand antenna groups 78 and 80 in out-of-phase relation, so as to provide the notched reference pattern 70, as shown in Fig. 3, with a null 72 in one direction and high side lobes 74 in other directions.

Shortly after the reference pulse, a triggering pulse is picked off the delay line 30 at the point 32 and is routed to the interrogation transmitter, which generates the first interrogation pulse $I_1$. The second interrogation pulse is similarly generated after a coded interval. In this case, the interrogation pulses are fed to the antenna 22 through the duplexer 36 and the hybridizer 38, which feeds the left and right hand antenna groups 78 and 80 in phase. This produces the highly directional interrogation pattern 56, having a large major lobe 58 and relatively low side lobes 60. The direction of the major lobe 58 is the same as that of the null 72.

If the aircraft 20 is in the major interrogation lobe 58, the transponder 26 will receive signals of the type shown in Fig. 6. The reference pulse R will be small compared with the interrogation pulses $I_1$ and $I_2$. Thus, the transponder will function normally, unaffected by the reference pulse, and will send back a reply, to be received and displayed by the receiver 40 and the display 28.

If the aircraft 20 is in the interrogation side lobe region, represented by the interrogation side lobes 60, the reference pulse R will be greater at the transponder 26 than the interrogation pulses $I_1$ and $I_2$, as shown in Fig. 7. Due to the echo suppressing action of the transponder, the large reference pulse will suppress the closely following interrogation pulse, with the result that the interrogation coding will be spoiled. Accordingly, the transponder will not send back a reply. Thus, the present beacon radar system suppresses unwanted side lobe replies and thereby prevents such replies from cluttering up the display screens of the various secondary radar units that may be within range of the transponder. The secondary radars will thus function with much greater clarity and reliability, particularly under conditions of high air traffic density and high concentration of radar equipment.

The side lobe suppressing system is fully compatible with prior equipment, inasmuch as the new radar ground equipment will cause normal replies from existing transponders, and may be used without interfering in any way with existing radar ground equipment. Furthermore, the side lobe suppressing action of the new system will be achieved with many existing transponders, having echo suppression circuits. Any transponders not thus equipped may readily be supplied with suppression circuits. The entire side lobe suppression system may be installed with the addition of only a minimum amount of new equipment. Thus, the new side lobe suppression system may be installed at quite low cost.

Figure 10:
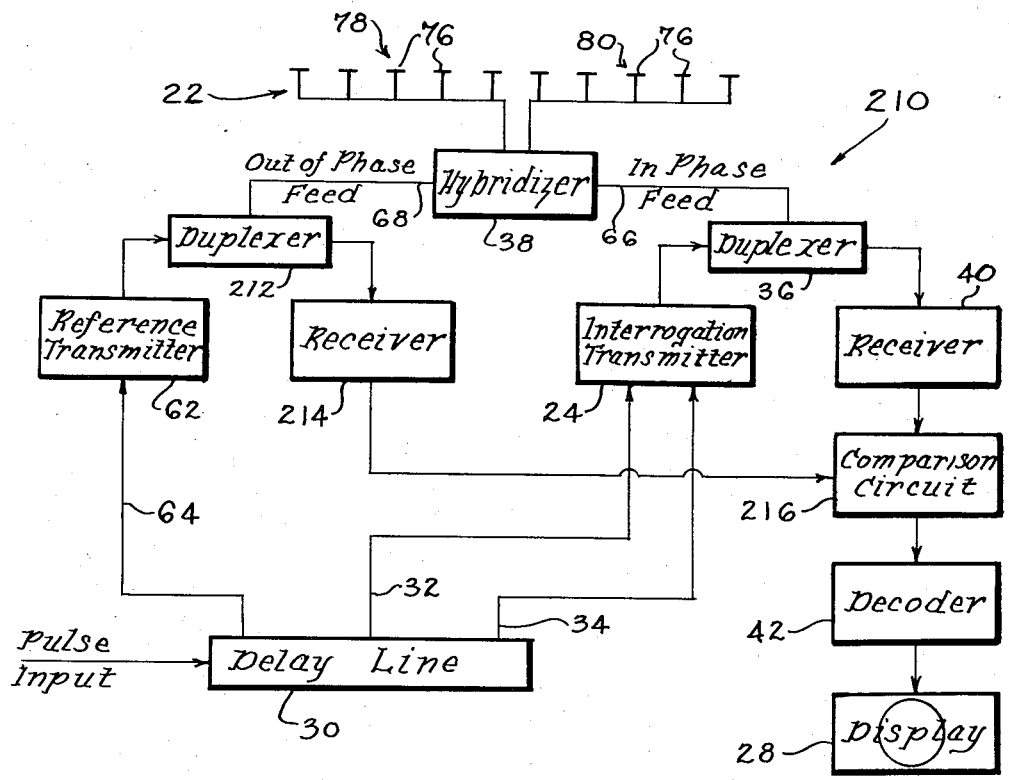
Fig. 10 is a block diagram, similar to a portion of Fig. 1, but showing a modification.

Fig. 10 illustrates a modified radar beacon system 210 which is arranged not only to provide for the suppression of side lobe interrogations, as in the system of Fig. 1, but also to suppress responses coming from the side lobe regions. In most respects, the modified radar beacon system 210 is the same as the system of Fig. 1. In so far as the system 210 is the same as that of Fig. 1, the components shown in Fig. 10 will be given the same reference characters as in Fig. 1. Thus, the delay line 30 supplies a triggering pulse to the reference transmitter 62, which thereupon generates a reference pulse. As before, the reference pulse is fed to the directional antenna 22 through the hybridizer 38 in such a manner as to produce a directional pattern which has high side lobes and a null in the primary direction. However, in the beacon system 210 of Fig. 10, the reference pulse is fed to the hybridizer 38 through a second duplexer 212 so that the directional pattern employed for reference transmission may also be utilized for reception. It will be seen that a second receiver 214 is arranged to receive its input from the duplexer 212. With respect to the second receiver 214, the antenna 22 has the same directional pattern as for reference transmission, with high side lobes and a null in the primary direction.

As in the arrangement of Fig. 1, the delay line supplies triggering pulses to the interrogation transmitter 24, which in turn generates interrogation pulses. After being routed through the duplexer 36, the interrogation pulses are fed to the antenna 22 by the hybridizer 38 in such a manner as to produce a directional pattern having low side lobes and a strong sharp lobe in the primary direction. The strength of the interrogation pulses in the side lobe regions is thus considerably less than the strength of the reference pulses, as in the system of Fig. 1.

As before, the first or primary receiver 40 receives its input from the duplexer 36. With respect to the receiver 40, the antenna 22 thereby has the same directional pattern as for interrogation transmission.

Instead of being routed directly to the decoder 42 and the display 28, the output of the primary receiver 40 is channelled through a comparison circuit or gate 216, which also receives the output of the secondary receiver 214. In a manner which is well known in itself, the comparison circuit 216 suppresses the pulses from the primary receiver 40, unless they are stronger than the corresponding pulses from the secondary receiver 214. In other words, the pulses from the primary receiver 40 pass through the comparison circuit 216 to the decoder 42 only if the pulses from the primary receiver 40 are greater in magnitude than the corresponding pulses from the secondary receiver 214. This arrangement has the effect of suppressing the signals which arrive at the antenna 22 from the side lobe regions. In the side lobes, the received signals will develop stronger pulses from the secondary receiver 214 than from the primary receiver 40. Only in the primary lobe of the interrogation pattern will the received signals develop stronger pulses in the primary receiver 40 than in the secondary receiver 214. It will be apparent that this arrangement has the effect of greatly increasing the directional selectivity of the antenna 22. Interrogation responses coming from the side lobe regions will not be registered and will not clutter up the display 28. Thus, the the number of unsynchronized, irrelevant responses registered on the display 28 will be greatly reduced. Thus, the beacon system will perform much more satisfactorily, particularly in areas where there are numerous beacon installations on the ground and numerous aircraft aloft to be interrogated.

Various other modifications, alternative constructions and equivalents may be employed without departing from the true spirit and scope of the invention as exemplified in the foregoing description and defined in the following claim.

I claim:

In a radar beacon system, the combination comprising a radar set having an interrogation transmitter for transmitting pairs of interrogation pulses with code spacing between the pulses of each pair, a transponder set for receiving and decoding said interrogation pulses and sending back pairs of coded reply pulses, a reference transmitter in said radar set for generating reference pulses closely preceding one interrogation pulse of each of said pairs of interrogation pulses, an antenna in said radar set having left and right hand groups of elements, hybrid junction means having first means for feeding said groups of antenna elements in phase from said interrogation transmitter and second means for feeding said groups of elements out of phase from said reference transmitter, said antenna radiating said interrogation pulses with a directional pattern having a single major interrogation lobe of high radiation and small interrogation side lobes on either side of said major lobe, said antenna radiating said reference pulses with a directional pattern having a substantial null corresponding in direction to said major interrogation lobe and reference side lobes on either side of said null and representing substantially greater radiation power than said interrogation side lobes, said interrogation pulses being radiated with substantially greater power than said reference pulses in said major lobe while being radiated with substantially less power than said reference pulses in said side lobes, and means in said transponder set for suppressing received pulses closely following other pulses of greater energy so as to suppress one of said interrogation pulses in said side lobes while leaving both of said interrogation pulses unsuppressed in said major lobe, said radar set having a first receiver for receiving reply pulses with the interrogation directional pattern, a first duplexer for routing received signals from said first means of said hybrid junction means to said first receiver during the intervals between the interrogation pulses, a second receiver for receiving signals with the reference directional pattern, a second duplexer for routing received signals from said second means of said hybrid junction means to said second receiver during the intervals between reference pulses, a display for displaying the output of said first receiver, and comparison means connected between said first receiver and said display and connected to the output of said second receiver for suppressing the output of said first receiver as to pulses of smaller magnitude than the corresponding pulses from said second receiver, signals received in the side lobes of said antenna thereby being suppressed.

References Cited in the file of this patent

UNITED STATES PATENTS

| | | |
|---|---|---|
| 2,741,759 | Parker et al. | Apr. 10, 1956 |
| 2,817,835 | Worthington | Dec. 24, 1957 |
| 2,825,900 | Collbohm | Mar. 4, 1958 |
| 2,885,677 | Zaleski | May 5, 1959 |

FOREIGN PATENTS

| | | |
|---|---|---|
| 610,664 | Great Britain | Oct. 19, 1948 |